United States Patent [19]

Shoaf et al.

[11] Patent Number: 4,517,214

[45] Date of Patent: May 14, 1985

[54] SWEETENING COMPOSITION AND METHOD

[75] Inventors: Myron D. Shoaf; La Monte D. Pischke, both of Danbury, Conn.

[73] Assignee: General Foods Corporation, White Plains, N.Y.

[21] Appl. No.: 491,237

[22] Filed: May 3, 1983

Related U.S. Application Data

[63] Continuation of Ser. No. 175,114, Aug. 4, 1980, abandoned, which is a continuation of Ser. No. 88,920, Oct. 29, 1979, abandoned, which is a continuation of Ser. No. 673,836, Apr. 5, 1976, abandoned, which is a continuation of Ser. No. 461,577, Apr. 17, 1974, abandoned.

[51] Int. Cl.$^3$ ............................................. A23L 1/236
[52] U.S. Cl. ...................... 426/548; 426/453; 426/456; 426/464; 426/471; 426/804
[58] Field of Search ............... 426/89, 96, 548, 453, 426/455, 471, 804, 456, 464

[56] References Cited

U.S. PATENT DOCUMENTS

| | | | |
|---|---|---|---|
| 3,492,131 | 1/1970 | Schlatter | 426/548 |
| 3,639,170 | 2/1972 | Hutton et al. | 426/471 X |
| 3,695,898 | 10/1972 | Hill et al. | 426/548 |
| 3,753,739 | 8/1973 | Cella et al. | 426/548 |
| 3,928,633 | 12/1975 | Shoaf et al. | 426/548 X |
| 3,947,600 | 3/1976 | Rousseau | 426/96 X |

*Primary Examiner*—Esther M. Kepplinger
*Attorney, Agent, or Firm*—Thomas R. Savoie; Thomas A. Marcoux; Daniel J. Donovan

[57] ABSTRACT

L-aspartic acid derivatives typified by L-aspartyl, L-phenylalanine methyl ester (APM) in crystalline form are agglomerated by a minor weight percent of a like solution serving as a permanent aggregating matrix at the spaced points of the contact in a random distribution of the crystals whereby they are assembled and immobilized to a free flowing form for use in dry food mixes.

1 Claim, No Drawings

SWEETENING COMPOSITION AND METHOD

This is a continuation of application Ser. No. 175,114 filed 8/4/80, which was a continuation of Ser. No. 088,920 of 10/29/79; which was a continuation of Ser. No. 673,836 of 4/5/76 which was a continuation of Ser. No. 461,577 of 4/17/74, all now abandoned.

BACKGROUND OF THE INVENTION

This invention relates to the art of preparing artificially sweetened comestibles and more particularly to means whereby the class of L-aspartic acid derivatives that are sweet are effectively converted to a free flowing mixable and highly soluble sweetening composition.

The members of the sweetening class of L-aspartic acid derivatives such as the dipeptide L-aspartic acid ester of L-phenylalanine, i.e., APM aforesaid, are characteristically less soluble than would be preferred for a so-called "instant" comestible like a beverage mix containing the artificial sweetener. Accordingly, means have been pursued to render the compounds in this class more readily dispersible and soluble as by subdividing them and thus improving their rate of solubility as well as their rate of dispersibility. Attempts at subdivision of the crystalline particles of such compounds to enhance the rate of solubility have not been too successful and alternative means have been employed to effectively improve the rate of dispersion and hence the overall rate of solubility. One common problem of such compounds appears to be their electrostatic properties; as recovered in crystalline form, they possess an inherent Zwitterion capacity; indeed as long as the compounds retain their identity as sweeteners it appears that they possess this capacity. Comestibles like beverage mixes containing food acids and powderous flavors and colors when commingled with the artificially sweetened compound will have erratic flow properties due the electrostatic properties of the compound. Also, such mixes are prone to dusting and are not free flowing relative to the more flowable active ingredients which characterize the mix; the consequence are irregularities or even inoperative beverage and like comestible recipes. Attempts at ammeliorating these effects as by screening are not effective since such attempts at subdivision are not permanent; the sweetening compound particles will reaggregate under the influence of their inherent electrostatic charges.

It would be desirable to have a form of L-aspartic acid-derived sweetening compound which is readily blendable and flowable and which has a high rate of solubility and dispersibility. Preferably, such a compound should be blendable with characterizing flavoring and coloring ingredients or itself should lend itself to flavoring and coloring while at the same time being a stable sweetening compound.

STATEMENT OF THE INVENTION

A procedure has now been identified whereby discrete crystals of L-aspartic acid derivative compounds meeting the foregoing requisites is produced by employing a minor amount of the compound per se in solution as a medium to aggregate the crystals thereof in an immobilized state, the crystals being assembled randomly at spaced points of contact by the dried solution of APM or like sweetening material.

In a typical subgeneric embodiment of this invention, indeed the preferred form thereof, the sweetening compound crystals are subdivided by hydromilling them to a uniform particle size incident to which some crystals will be dissolved and form agglutinating solutes; this hydromilled slurry, preferably at a reduced temperature whereat solution is minimized, is then dried as by spray drying droplets produced by pumping the slurry through an atomizing nozzle; the droplets advantageously dry in a form whereby the subdivided discrete crystals nest with one another while a part of the droplet and are permanently bound to one another by the solute sweetening compound at their points of contact such that when the droplet is recovered as a dry powder a permanent agglomerate of sweetening compound in a free flowing, rounded form is recovered.

Another subgenus of the invention involves the conversion of the sweetening compound into a semi-moist meal or dough consistency produced by combining limited quantities of water and the sweetening compound in crystalline form, whereby the water partially dissolves a portion of the sweetening compound forming an agglutinating solution which enables the moist mixture of crystalline solids to be converted into an handleable mass, as by extruding at room temperature, which extrudate or otherwise-shaped mass can be dried and subsequently ground; the aggregated particles will possess the same characteristic random nesting of crystalline sweetening compounds adhering at their spaced points of contact through the intermediation of redried sweetening compound acting to bridge the crystalline particles into immobilized granules.

DETAILED DESCRIPTION OF THE INVENTION

The processes of this invention and the products, that is the compositions produced thereby, will be chosen dependent upon the intended advantageous use to be made of the product. In the case of the preferred spray dried form of particle having a very free flowing, high rate of solubility, this application will be preferred for beverage uses whereas in other applications than in dry beverage mixes it may be practical to resort to the dough-forming techniques to be hereinafter described wherein a more granular form of particulate structure will be suitable.

The invention will be useful in the effective fixation of a broad class of L-aspartic acid derivatives which will be categorized as follows:

(1) Those disclosed in Squibb Sons Inc. W. German application No. 2,054,545 filed May 11, 1970 claiming U.S. priority of Dec. 11, 1969 as Ser. No. 876,054 for the methyl esters of L-aspartyl-2, 5-Dihydro-L-phenylalanine; L-aspartyl-L-(1-cyclohex-1-en)-alanine; L-aspartyl-L-phenylglycine; L-aspartyl; L-2,5-dihydro-phenylglycine;

(2) methyl-L-aspartyl-L-alpha phenylglycinase and its salts as disclosed in French Pat. No. 2,877,486 issued Jan. 21, 1972 to R. H. Rhoné-Poulene SA;

(3) The lower alkyl esters of L-aspartyl-L, (Beta-cyclohexyl) alanine disclosed in Swiss Pat. No. 6,905,910 issued Feb. 18, 1971 to Imperial Chemicals Industries Ltd.;

(4) Those alkyl esters classed as alpha-L or DL-aspartyl-L or DL-substituted glycine described in Netherlands Pat. No. 7,007,176 issued May 19, 1970 preparation of aspargyl compounds and issued to Stamicarbon, NV.;

(5) Those hydrogenated dipeptide ester sweeteners such as L-asparagio-O-etherfield serine methyl esters described in French Pat. No. 2,105,896 issued Apr. 28, 1972 for Dipeptide Ester Sweeteners to Takeda Chemical Industries Ltd.;

(6) Those aspartic acid peptide esters described in Belgium Pat. No. 2,321,079 issued Nov. 15, 1973 to SEARLE & CO., G.D. claiming the formula:

where R and $R_1$ are $CH_3$ or $C_2H_5$ and $R_2$ is 4-7C alkyl having the stereo chemical form L—L, DL—L, L—DL, or DL—DL;

(7) Those sweetening agents having the compound:

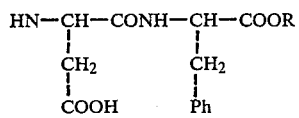

shown in British Pat. No. 1,339,101 issued Nov. 28, 1973 to Searle and Co., G.D. wherein R is a lower alkyl such as methyl and is prepared by reacting an N-protected-L-aspartic anhydride with L-phenylalanine lower alkyl esters, and (8) Those sweetening preparations having the formula L-aspartyl-L-1, 4-dimethyl-pentyl amide disclosed in German Pat. No. 2,306,909 issued Aug. 23, 1973 to Procter and Gamble.

In the preferred spray drying process, the L-aspartic acid derivative crystal solids at a minor weight percent are admixed with water and converted into a slurry maintained at a temperature much below 150° F. and typically at ambient room temperature conditions, whereby a minimum of the sweetening compound is allowed to go into solution, the base majority of the derivative crystalline materials being undissolved and at most hydrated. This slurry is thereafter subjected to a hydromill processing wherein it will be forced hydromilled or otherwise colloidally milled under pressure between a narrow orifice operative to subdivide the crystalline material to a uniform particle size distribution as by passage between a mill having an opening less than 125 microns intermediate the working mill faces.

The hydromilled slurry is thereafter spray dried into the intended form. The partial solution of the sweetening compound will be just sufficient to provide the agglutinating adhesion intermediate the undissolved crystalline sweetening compound solids whereby when a droplet is caused to undergo evaporation the crystals will be randomly aggregated at their spaced points of contact through the intermediation of the redried compounds per se.

As indicated, the slurry may be dried by means other than spray drying, spray drying being most preferred in that by the formation of a droplet and the surface tension effects produced thereby the crystals are caused to be assembled into a spherical aggregated condition whence they may be permanently bonded to one another in the structure intended to provide a substantial immobilization and reduction of the effects of the electrostatic charges thereof. A slurry may be dried by any one of a number of well known drying methods of use in accordance with the food arts such as drum drying, oven drying, freeze drying, etc.; in all of these applications, a slurry form that is relatively cool will be employed and if the slurry is dried in this unitary condition en masse, it will be subsequently subdivided into the granular state of use.

In lieu of a slurry form, a dough may be produced which takes advantage of the glutinous character of the pepetide and equivalent hydrated crystals which is generated by the addition of a minor weight percent of water thereto, whence a suitable dough or meal that is moist will be produced and converted into a shape-retaining form as by the preferred step of extrusion subsequent to which the shape will be redried and incident to which redrying the individual crystals will be permanently bonded to one another through the intermediation of the redried dissolved sweetening compounds.

The slurry or dough practices do not preclude the presence in the aqueous phase of compatible inert or adjunctive agents such as colors and even flavors provided they are sufficiently incapable of entering into unstabilizing reactions with the L-aspartic acid derivative; thus, the aqueous medium used to produce the slurry or meal may have the coloring matter dissolved in the aqueous solvent; e.g. a spray dried form can be advantageously colored requiring no blending for this pupose. Likewise, water insoluble materials may be emulsified or homogenized in the aqueous medium forming a slurry or the dough for efficacious combination with the sweetening compound, the remaining water present being operative to effect the partial dissolution of the compound and form the agglutinating bridging solution.

Moreover, other artificial sweeteners such as saccharin and/or cyclamates may be blended at minor weight percents of the total composition to provide a balanced organoleptic sweetening impact by force of the uniformity of their distribution throughout the slurry or dough matrices depending upon the particular process employed; in this application, it will be desired to employ the cyclamate at a very minor weight percent of the saccharin which in turn will be a very minor weight percent of the total L-aspartic acid compound solids used whereby a preferred balanced organoleptic sweetness will be afforded when the total sweetening compounds are rendered soluble and used in beverage or other food applications. In these applications, the artificial sweeteners may be either dissolved in the aqueous phase or dry blended in the non-aqueous phase and will be effectively fixed through the random aggregation of the crystalline L-aspartic acid derivative compound per sel.

All of these applications will produce a most flowable and blendable, stable, highly soluble composition which avoids the disadvantages stemming from the electrostatic properties still possessed by the compound itself.

The invention will now be more fully understood by reference to the accompanying operative best modes thereof.

EXAMPLE 1

APM crystals (30%) and room temperature tap water (70%) are admixed; the admixture is then charged to a Fryma mill wherein the particles are caused to pass an opening having a gap setting of about 75 microns operative to reduce the particle size of the APM crystals and subdivide any clusters thereof resulting in a fluid, pulpable, creamy slurry which at room temperature is pumped to a spray drying, atomizing nozzle which charges, under a spray pressure of 425 psig, the droplets into a vertical, spray drying tower having an inlet drying air temperature of 410° F. and an outlet air temperature of about 235° F. with a air flow of approximately 2600 cubic feet per minute. The dried droplets' charge was recovered at a moisture content of 1.07% and a density of 0.248 grams per cc and 0.304 grams per cc packed—the density resulting from tapping a charge of the material until it approaches assymptotic density reduction under the influence of tapping per se with no overt position mechanical displacement force.

The dried particles had the following particle size distribution:

| Sieve Number (U.S.S.) | % on Sieve |
|---|---|
| +60 | 0.60 |
| −60. +70 | 25.4 |
| −70. +120 | 58.03 |
| −120. +140 | 11.80 |
| −140 +200 | 3.80 |
| −200. +300 | 0.30 |
| −300 | 0.07 |

The dried product will be noted to have a very uniform particle size distribution wherein 99% of the particles are between 60–200 mesh size; advantageously the composition has a narrow particle size distribution such that the particles are neither too coarse nor too fine and thus the composition lends itself admirably to blending with other dry mixed ingredients. 1.10 grams of the spray dried APM agglomerates, dry blended with 3.60 grams of anhydrous citric acid can be spoonstirred in 1892 millimeters of water at 45° F. for 40 seconds and will form a complete solution; a like mixture of APM acid mix that is unprocessed will take bewteen 60 and 90 seconds to go into solution depending upon particle distribution and size of the sweetening compound therein.

A complete beverage mix of color, flavor and citric acid, blended with the processed APM particles of this invention, had a free flow capacity which was quite acceptable to food manufacturing processes.

What is claimed is:

1. A process for producing a flowable form of the dipeptide sweetener L-aspartyl-L-phenylalanine methyl ester, which form has a high rate of solubility and dispersibility, comprising the steps of:
    (a) forming an aqueous slurry, the ingredients consisting of water and a minor weight percent of crystalline particles of L-aspartyl-L-phenylalanine methyl ester;
    (b) maintaining said slurry at a temperature below 150° F. such that the vast majority of the crystalline material remains as undissolved particles and a minor amount of this material dissolves in the water with the resulting solution being distributed throughout the undissolved particles;
    (c) hydro-milling the slurry to a particle size of less than 125 microns; and
    (d) spray drying the milled slurry to produce a dry powder wherein subdivided discrete crystals of the dipeptide sweetener nest with one another and are permanently bound to one another at spaced points of contact by the dried solution.

* * * * *

UNITED STATES PATENT AND TRADEMARK OFFICE
CERTIFICATE OF CORRECTION

PATENT NO. : 4,517,214

DATED : May 14, 1985

INVENTOR(S) : MYRON D. SHOAF, et al.

It is certified that error appears in the above-identified patent and that said Letters Patent are hereby corrected as shown below:

On the cover sheet, in the paragraph headed Related U.S. Application Data, at line 2, "88,920" should read -- 88,926 --.

Signed and Sealed this

Sixth Day of September, 1988

Attest:

DONALD J. QUIGG

Attesting Officer

Commissioner of Patents and Trademarks